United States Patent [19]

Hoffman

[11] Patent Number: 4,927,126

[45] Date of Patent: May 22, 1990

[54] PRECISION VISE

[76] Inventor: Frank Hoffman, 1101 Connecticut St., Imperial Beach, Calif. 92032

[21] Appl. No.: 240,951

[22] Filed: Sep. 6, 1988

[51] Int. Cl.[5] .......... B23Q 1/04

[52] U.S. Cl. .......... 269/60; 269/77; 269/271; 269/251

[58] Field of Search .......... 409/219, 220; 82/33 R, 82/33 A, 40 R, 45; 51/216 R; 269/60, 71, 17, 77, 78, 84, 246, 250, 251, 45, 271

[56] References Cited

U.S. PATENT DOCUMENTS

| | | | |
|---|---|---|---|
| 2,203,162 | 6/1940 | Lee | 269/60 |
| 2,341,619 | 2/1944 | Huss | 269/60 |
| 4,177,978 | 12/1979 | Warsaw | 269/17 |
| 4,317,560 | 3/1982 | Troyer | 269/60 |
| 4,577,844 | 3/1986 | Schlegel et al. | 269/71 |
| 4,655,654 | 4/1987 | Portas | 269/60 |

*Primary Examiner*—Robert C. Watson

*Attorney, Agent, or Firm*—Brown, Martin, Haller & McClain

[57] ABSTRACT

An apparatus for holding small articles comprises an elongated post, a rail member selectively slidably mounted at one end of the post at an angle relative to the longitudinal axis of the post, and a workpiece holding assembly mounted on the upper surface of the rail member. The workpiece holding assembly has a workpiece engaging device fixedly mounted at one end of the rail member and a selectively slidable jaw mounted on the upper surface of the rail member to allow holding workpieces of varying sizes and shapes between the slidable jaw and the workpiece engaging assembly.

17 Claims, 2 Drawing Sheets

PRECISION VISE

BACKGROUND OF THE INVENTION

The present invention relates generally to precision vises for securely holding small articles for precision machine operations.

Various types of securing devices are currently used for holding small articles during milling, grinding and other machine operations. Generally, the article is held in a large vise using an assortment of blocks of varying dimensions and geometric shape. One disadvantage of this type of holding assembly is that, in operational use, it does not readily accommodate workpieces of varying shapes. Moreover, the prior type of assembly does not readily permit a change in orientation of the article relative to its initial orientation. The selection and assembly of appropriate holding blocks require substantial time and effort. When it is desired to change the orientation of the article, additional time and effort in selecting appropriate holding blocks is often required. Thus, the current known approach is inefficient.

SUMMARY OF THE INVENTION

One purpose of the present invention to provide a precision vise for holding small articles during operational use, such as milling, tooling and the like. According to the present invention, a precision vise is provided which comprises an elongated post having opposed flat surfaces for clamping between the jaws of a mounting device such as a conventional vise, and a vise head adjustably mounted on the post, the vise head having opposed jaws and an adjustment device for varying the separation between the jaws to clamp a workpiece on the vise head. The vise head is mounted at a desired angle relative to the longitudinal axis of the post.

Since the vise is itself mounted on a conventional vise or other clamping device in operation via the post, the orientation of a workpiece held between the jaws can be readily adjusted without releasing the jaws, simply by adjusting the orientation of the post. The post is preferably an elongate shaft of square or rectangular cross-section, having opposed parallel flat faces with rounded corners, for easy mounting and ready adjustment in a conventional vise or chuck. Workpieces of varying shape can be easily mounted in the vise head, while the post is of a shape designed for ready clamping in a conventional vise or chuck.

The vise head includes an upper surface having a fixed jaw located thereon at one end and a movable jaw slidably secured along the upper surface.

In a preferred embodiment of the invention, the vise head includes a slot in its lower surface for receiving a flange located on a head adjusting screw, which screw extends transversely to the central longitudinal axis of the post and seated therein, thus providing a precision adjustment means whereby the vise head can be incrementally slid along the post channel. The vise head may be maintained at a desired position relative to the longitudinal axis of the post by compressing the compression slot. The post is provided with a clamp screw transverse to the compression slot for reversibly compressing the slot.

The fixed and movable jaws include inner opposing faces the upper edges of which are each provided with a recess for receiving workpieces of varying dimensions. Moreover, the faces are each further provided with a central V-shaped notch transverse to the longitudinal axis of the vise head. Thus, the jaws are capable of receiving and holding a variety of workpieces of varying dimensions and shapes.

This invention allows a workpiece to be held quickly and easily in a variety of orientations and is readily adjustable for workpieces having a variety of shapes and dimensions.

BRIEF DESCRIPTION OF THE DRAWINGS

The present invention will be better understood from the following detailed description of a preferred embodiment, taken in conjunction with the accompanying drawings, in which like reference numbers refer to like parts, and in which.

DETAILED DESCRIPTION OF THE PREFERRED EMBODIMENT

Figure 1:
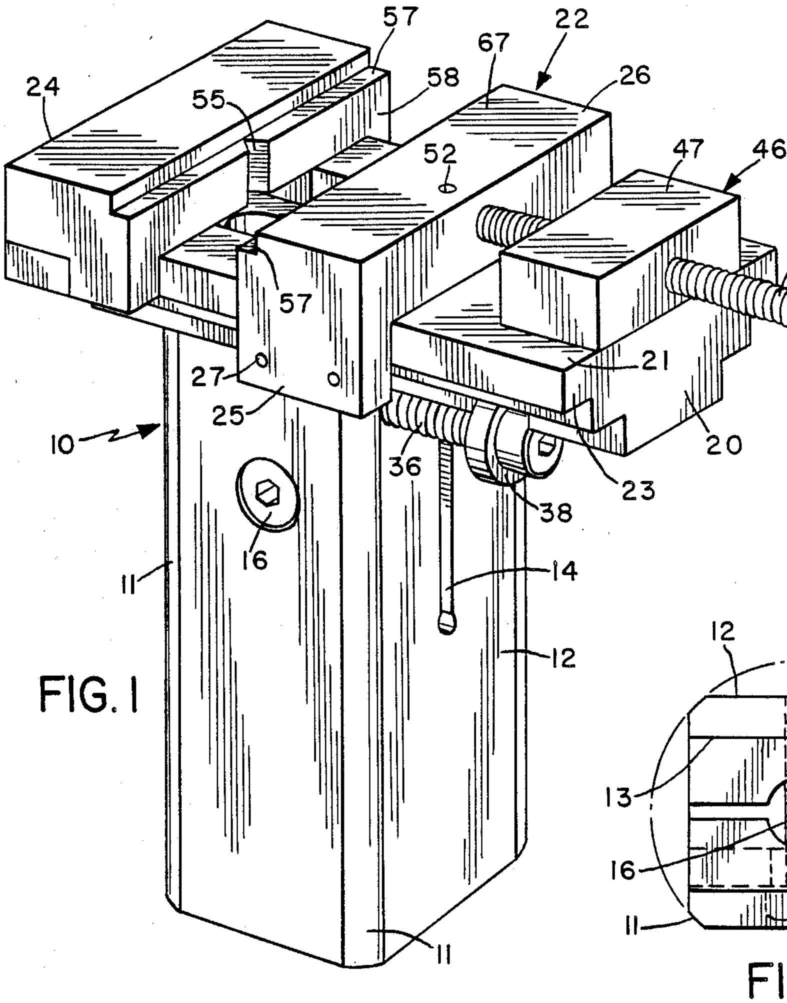
FIG. 1 is a perspective view of the complete vise assembly.
Figure 2:
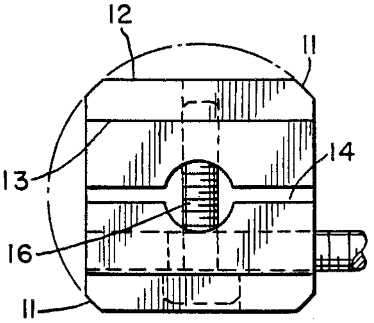
FIG. 2 is a top plan view of the post element.
Figure 5:
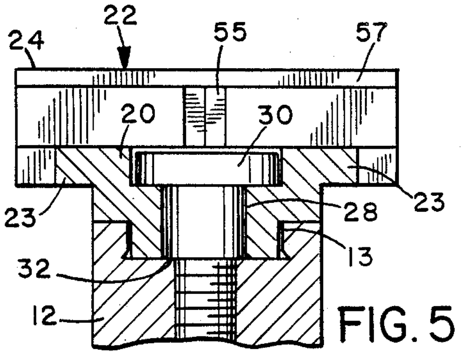
FIG. 5 is a sectional view taken on line 5—5 of FIG. 3.
Figure 6:
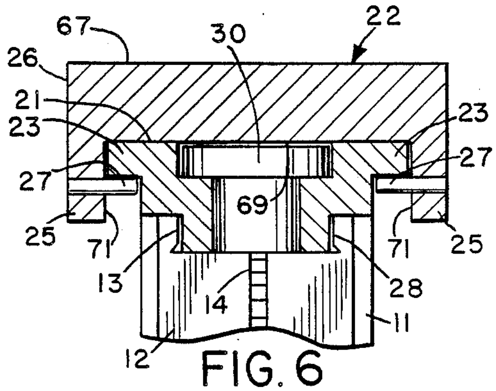
FIG. 6 is a sectional view taken on line 6—6 of FIG. 3.

A precision vise 10 according to a preferred embodiment of the present invention is illustrated in the drawings. The vise 10 basically comprises an elongated post 12 having channel 13 at one end for slidable engagement with rail member 20 of vise head 22, as best indicated in FIGS. 5 and 6, and fixed and movable jaws, 24 and 26 respectively, mounted on the upper surface 21 of the rail member. In a preferred arrangement, the rail member 20 is mounted at a 90-degree angle relative to the longitudinal axis of post 12 but in other arrangements the rail member can be mounted at varying angles relative to the post axis. Post 12 is preferably generally rectangular block-like with flat faces providing opposed contact areas for holding the post in a vise or other holding device. The post is further provided with compression slot 14 and clamp screw 16 for releasably securing vise head 22 in a desired position relative to the longitudinal axis of the post. Tightening clamp screw 16 narrows the width of compression slot 14, thus firmly clamping vise head 22 in a fixed position. As best indicated in FIGS. 1 and 2, post 12 is preferably provided with rounded edges 11, each having a common radius about the post axis. The rounded edges Il allow the post to be firmly seated in a machine chuck to facilitate performance of rotational machining operations on a workpiece secured within vise 10.

Figure 3:
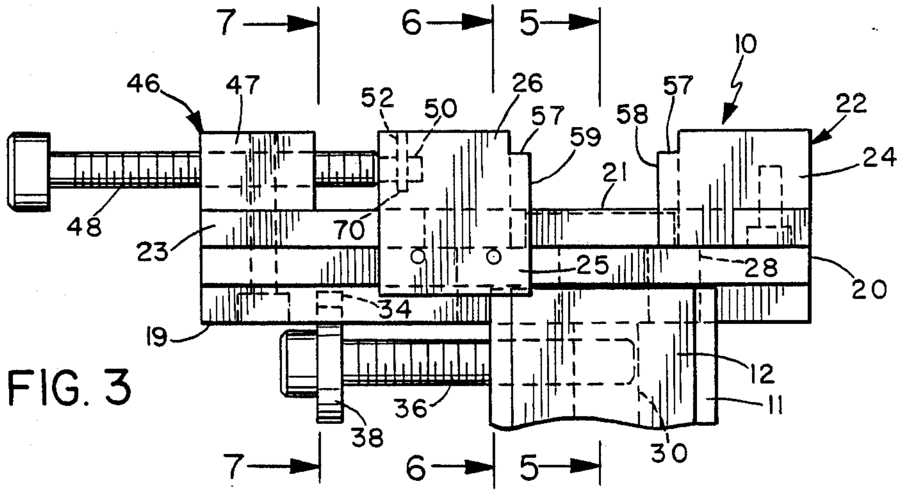
FIG. 3 is a side elevation view of the vise head and post structure.

Rail member 20 is provided with a lateral elongated slot 28 through which head securing screw 30 is positioned. Screw 30 engages post 12 and has a shoulder 32 for slidably securing the rail member to the post, thus permitting the rail member to travel back and forth in post channel 12 between two end points determined by the length of slot 28. As shown in FIG. 3, rail member 20 is also provided with notch 34 extending inward from its lower surface 19 for closely receiving flange 38 which extends radially outward from head adjusting screw 36 seated in post 12. Vise head 22 may thus be laterally shifted relative to the post axis by rotation of head adjusting screw 36. Moreover, the head adjusting screw is preferably provided with micrometer threads, thus permitting the vise head to be laterally shifted a predetermined distance relative to the post axis by rotation of the head adjusting screw through a given arc. In an alternative arrangement, the head adjusting screw and flange could be made as one part, with the flange comprising a generally circular extension radiating outward from the screw head.

Figure 7:
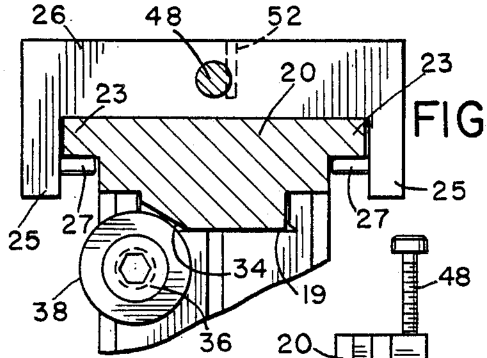
FIG. 7 is a sectional view taken on line 7—7 of FIG. 3.

The upper surface 21 of the rail member 20 is flat for slidable engagement with the flat lower surface 69 of movable jaw 26. As best illustrated in FIGS. 1, 6 and 7, the movable jaw includes, at its outer edges, jaw extensions 25 which project perpendicularly downward from its upper surface 67. Jaw extensions 25 are provided with a plurality of retaining pins 27 which project perpendicularly inward from the respective inner surfaces 71 of the jaw extensions 25 and are located to fit beneath the outer extensions 23 of rail member 20, thus permitting movable jaw 26 to be slidably mounted to the upper surface of the rail member.

Figure 4:
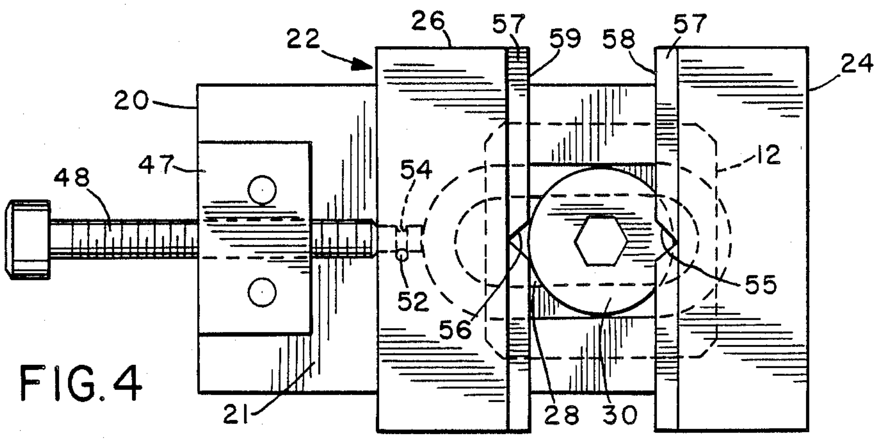
FIG. 4 is a top plan view of the structure of FIG. 3.

As illustrated in FIGS. 3 and 4, the vise head further includes a jaw adjusting assembly 46 comprising nut block 47 mounted at one end of the upper surface 21 of the rail member and jaw adjusting screw 48 threadably engaged with a passage through the nut block 47 and seated in cavity 50 located at the proximal end of the movable jaw 26. The jaw adjusting screw 48 has groove 54 for rotatably securing the screw within the cavity 50 by cooperation with screw retaining pin 52 located in a hole 70 in the movable jaw 26 transverse to the screw axis.

Fixed jaw 24 is mounted on the upper surface of the end of the rail member 20 opposite the nut block 47. As indicated in FIGS. 1 and 4, both the fixed and movable jaws are preferably provided with opposing V-shaped notches 55 and 56 located on their respective inner faces 58 and 59. The V-shaped notches permit firm gripping of generally cylindrical portions of workpieces of varying sizes. The upper edges of the inner faces 58 and 59 are further provided with opposed recesses 57 for gripping workpieces of varying dimensions and shapes. The parts of the vise are preferably made of steel or other high strength metal.

Figure 8:
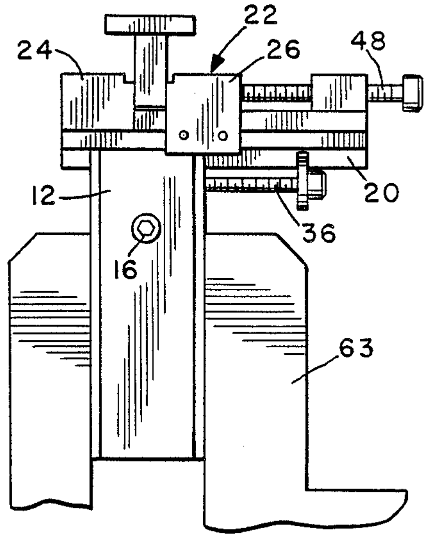
FIG. 8 is a side elevation view, on a reduced scale, showing the vise mounted in a conventional machine vise and holding a workpiece.

FIG. 8 illustrates the invention mounted in a conventional vise 63 and holding a workpiece in suitable orientation for typical machine operation such as milling, boring and the like. The flat faces of the post permit the workpiece to be quickly and easily reoriented in a variety of positions.

Figure 9:
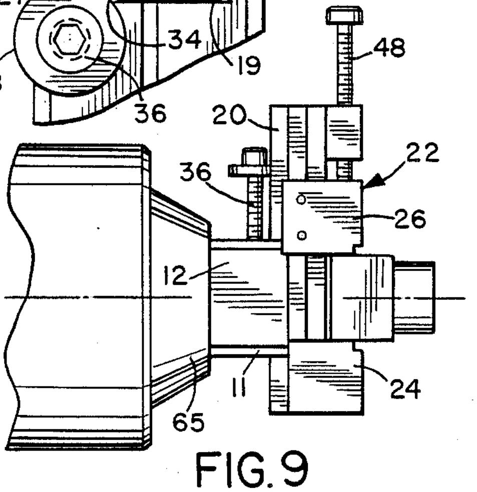
FIG. 9 is a side elevation view of the vise mounted in a machine chuck.

FIG. 9 illustrates the invention mounted in a machine chuck 65 such as commonly found on a lathe. This mounting arrangement facilitates use of the invention to readily and firmly hold a workpiece during rotational machining operations, such as cutting of circular grooves concentric to the post axis.

In operation, the vise is mounted in a conventional vise or other holding device. The workpiece is inserted between the jaws and gripped securely by tightening the jaw adjusting screw causing the movable jaw to approach the fixed jaw. The head adjusting screw is then rotated in either direction, thus moving the vise head to a desired position relative to the longitudinal axis of the post. The vise head is then secured in the desired position by tightening the clamp screw. The invention may alternatively be placed in a chuck secured about the rounded corners of the post for lathe operations and the like.

The vise described above can be set up quickly and easily to hold miniature workpieces of varying dimensions and geometric shapes. It is easily and precisely adjustable and can be calibrated to hold and reorient a workpiece relative to a number of desired axes. The vise can hold an odd-shaped workpiece, tooling jig and the like. The vise is of solid construction and provides a good and secure gripping force.

Although a preferred embodiment of the invention has been described above by way of example only, it will be understood by those skilled in the field that modifications may be made to the disclosed embodiment without departing from the scope of the invention, which is defined by the appended claims.

I claim:

1. A portable apparatus for holding small workpieces relative to a fixed mounting device, comprising:
- an elongated post having opposed flat surfaces for releasably clamping the post at one end between the jaws of a fixed mounting device;
- a rail member selectively slidably mounted at one end of the post for movement transverse to the longitudinal axis of the post;
- a workpiece holding assembly mounted on the upper surface of the rail member, the workpiece holding assembly having a workpiece engaging means fixedly mounted at one end of the rail member for engaging a workpiece and a selectably slidably jaw means mounted on the upper surface of the rail member for releasably holding the workpiece adjacent the workpiece holding means.

2. The apparatus as claimed in claim 1, wherein the rail member is mounted at a 90-degree angle relative to the longitudinal axis of the post.

3. The apparatus as claimed in claim 1, wherein the post has rounded edges having a common radius about the longitudinal axis of the post.

4. The apparatus as claimed in claim 1, wherein the post has a locking means for releasably locking the rail member at a predetermined lateral position relative to the longitudinal axis of the post.

5. The apparatus as claimed in claim 1, wherein the locking means comprises a compression slot located in the post end adjacent the rail member, and a clamp screw threadably mounted in the post transverse to the slot and extending therethrough.

6. The apparatus as claimed in claim 1, wherein the rail member has a lateral positioning means for laterally positioning the rail member relative to the longitudinal axis of the post.

7. The apparatus as claimed in claim 6, wherein the lateral positioning means comprises a slot located in the lower surface of the rail member and a positioning screw threadably seated in the post, the screw having a flange for engagement with the slot.

8. The apparatus as claimed in claim 7, wherein the screw has micrometer threads.

9. The apparatus as claimed in claim 1, wherein the workpiece engagement means comprises a jaw fixedly mounted on the upper surface of the rail member at one end of the surface.

10. The apparatus as claimed in claim 9, wherein the selectively slidable jaw means comprises a movable jaw slidably mounted on the upper surface of the rail member, the jaw having a cavity, a nut block located on the upper surface of the rail member, the nut block having a threaded passage therethrough, and a jaw adjusting screw threadably extending through the passage in the nut block and rotatably seated in the cavity of the jaw.

11. The apparatus as claimed in claim 10, wherein the movable jaw has jaw extensions extending perpendicularly downward from the upper surface of the jaw, the jaw extensions having a plurality of retaining pins projecting inward from the inner surfaces of the jaw extensions, and the rail member having outer extensions for slidably engaging the retaining pins.

12. A portable apparatus for holding small workpieces relative to a fixed mounting device, comprising:

an elongated post having opposed mounting surfaces at least adjacent one of its ends for releasably mounting the post between the jaws of a fixed mounting device;

a rail locating surface at the opposite end of the post extending transverse to the longitudinal axis of the post;

a rail member selectively slidably mounted on said rail locating surface, the rail member having lateral positioning means for laterally positioning the rail member relative to the longitudinal axis of the post and the post having a locking means for releasably locking the rail member at a predetermined lateral position relative to the longitudinal axis of the post;

a workpiece holding assembly mounted on the upper surface of the rail member, the workpiece holding assembly having a workpiece engaging means fixedly mounted at one end of the rail member for engaging a workpiece, the workpiece engaging means comprising a jaw fixedly mounted on the upper surface of the rail member at one end of the surface, and a selectably slidable jaw means mounted on the upper surface of the rail member for releasably holding the workpiece adjacent the workpiece engaging means.

13. The apparatus as claimed in claim 12, wherein the locking means comprises a compression slot located in the post end adjacent the rail member, and a clamp screw threadably mounted in the post transverse to the compression slot and extending therethrough.

14. The apparatus as claimed in claim 12, wherein lateral positioning means comprises a positioning slot located in the lower surface of the rail member, and a positioning screw threadably seated in the post, the positioning screw having a flange for engagement with the slot.

15. The apparatus as claimed in claim 12, wherein the selectively slidable jaw means comprises a movable jaw slidably mounted on the upper surface of the rail member, the jaw having a cavity, a nut block located on the upper surface of the rail member, the nut block having a threaded passage therethrough, and a jaw adjusting screw threadably extending through the passage in the nut block and rotatably seated in the cavity of the jaw.

16. The apparatus as claimed in claim 12, wherein the jaws have opposing V-shaped notches in their opposing faces.

17. The apparatus as claimed in claim 12, wherein each jaw has an elongate recess extending alkong its upper, innermost edge.

* * * * *